US005341606A

United States Patent [19]

Hirabayashi

[11] Patent Number: 5,341,606

[45] Date of Patent: Aug. 30, 1994

[54] DEVICE FOR CUTTING AND GRINDING A DOUGHNUT SHAPED SUBSTRATE AND A METHOD THEREFOR

[75] Inventor: Toshihiko Hirabayashi, Higashikurume, Japan

[73] Assignee: Kyokuei Kenmakako Kabushiki Kaisha, Tokyo, Japan

[21] Appl. No.: 6,506

[22] Filed: Jan. 19, 1993

[30] Foreign Application Priority Data

Jan. 29, 1992 [JP] Japan .................................. 4-036997

[51] Int. Cl.[5] .............................................. B23B 35/00

[52] U.S. Cl. ............................... 51/283 R; 51/283 E; 51/206 R; 408/1 R; 125/20

[58] Field of Search ............. 51/206 R, 283 R, 283 E, 51/209 R, 326, 327, 290; 125/20; 408/1 R, 36

[56] References Cited

U.S. PATENT DOCUMENTS 3,822,516 7/1974 Huber .................................... 51/326
4,541,758 9/1985 Frank .................................... 125/20
4,800,686 1/1989 Hirabayashi ....................... 51/206 R
4,843,766 7/1989 Umeda .............................. 51/206 R
4,872,289 10/1989 Yukawa ............................... 51/5 R

FOREIGN PATENT DOCUMENTS 6364459 10/1986 Japan .............................. B24B 9/00
6364460 10/1986 Japan .............................. B24B 9/00
63201048 6/1987 Japan .............................. B24B 9/00
0582972 12/1977 U.S.S.R. .
0585989 12/1977 U.S.S.R. ........................... 51/283 R

OTHER PUBLICATIONS

Phamphlet: Semi Automatic Simultaneous Processing Machine of Glass Disk Inside & Outer Circumstances Shiba R & D.
Magazine: Lens. Prism Working Techniques '80 Publ. Nov. 2, 1985.

*Primary Examiner*—Jack Lavinder
*Attorney, Agent, or Firm*—Hayes, Soloway, Hennessey, Grossman & Hage

[57] ABSTRACT

A device and method for cutting and grinding a hard but brittle material (such as glass plate, etc.) for producing a doughnut-shaped substrate are provided. The device of the present invention comprises a tubular core rod and shank extending therefrom and coaxial therewith. A plate is attached to the rod and shank and extends therefrom. A skirt is attached to the plate and surrounds the rod. Both the rod and skirt include at least one circumferential cavity. A core drill and a skirt drill are integral with the core rod and skirt, respectively. The cavities, skirt, and drills include diamond whetstone parts.

8 Claims, 4 Drawing Sheets

DEVICE FOR CUTTING AND GRINDING A DOUGHNUT SHAPED SUBSTRATE AND A METHOD THEREFOR

BACKGROUND OF THE INVENTION

1. Field of the Invention

The present invention relates to a device and a method for cutting and grinding a doughnut shaped substrate of a hard but brittle material such as plate glass etc.

2. Description of the related art

As materials of disc substrates used for high density information media, conventionally metals such as aluminium etc. and non-metallic materials such as ceramic, plastic are used, and recently, glass material has come to be used greatly with the reason that it is excellent in flatness (degree of planarity).

As a disc substrate, in general, a doughnut shaped substrate having a circular hole at its central portion has been widely used. However, in the case of a doughnut shaped substrate of glass just after its having been cut, many minute irregularities generated in the course of cutting and grinding of the substrate remain at the inner circumference and the outer periphery of the substrate, so that finishing work and chamfering work must be carried out for removing the irregularities and improving strength of the substrate.

Because of the aforedescribed reasons, conventionally, for example, as disclosed in Japanese utility model laid-open publication No. 63-201048 and Japanese utility model laid-open publication No. 63-64460, glass is cut to a doughnut shape and the doughnut shape substrate is suctionedly secured on a vaccum suctioning table. Then, the doughnut shape substrate is accommodated in an inner circumference and outer periphery cutting and grinding device. In the device both the inner circumference and the outer periphery of the doughnut shape substrate are contacted with annular cavities formed respectively at the circumferential wall and the outer periphery of a core, and by rotating the device and the vacuum suctioning table respectively and give horizontal movement between the device and the substrate to cut and grind the inner circumference and the outer periphery of the doughnut shape substrate.

However, in the afore-described conventional method for manufacturing a doughnut shape substrate, at least two steps are indispensably necessary. That is, one of them is a work to cut a glass plate to a doughnut shape, and the other is to perform finishing and chamfering work of the peripheral surface.

Therefore, one place for cutting down a doughnut shape plate(s) from a glass plate and the other is an operating place at which work for finishing and chamfering the inner circumference and the outer periphery of the doughnut shape plate are carried out. Thus, wide space is needed. Further, after the doughnut shape plate is cut down from the glass plate, when the doughnut plate is placed on the vacuum suctioning table on which the finishing and chamfering work is performed, aligning their axes is very complicated and if they do not coincide precision of the doughnut shape substrate is lowered.

SUMMARY OF THE INVENTION

The present invention has succeeded in solving the afore-described disadvantages of the conventional ones. That is, the main object of the present invention is to provide a device for cutting and grinding a doughnut shaped substrate by using only a single device capable of cutting and grinding a hard but brittle material such as glass plate etc. without shifting working place and operating the device at one side of the material to be worked, and a method for making the same.

In order to achieve the afore-described object the device for cutting and grinding the doughnut shape substrate comprises a shank, a core drill being coaxial with the shank and a skirt formed at the outer periphery of the core rod so as to surround it. At the outer periphery of substantially central portion of the core rod at least one annular concave portion (cavity) is provided, and at the inner circumference of the skirt there is also formed an annular cavity which is the same height as that of the concave portion provided at the core rod. At the tip end of core rod a tubular shaped core drill is integrally formed therewith, and at the tip end of the skirt there is provided a skirt drill integrally with it. At the inner circumference of the core drill, at the outer periphery of the skirt drill and both the annular cavities of the core rod and the skirt there are provided diamond whetstone parts.

In addition, the method for cutting and grinding a doughnut shaped substrate according to the present invention is characterized in that the core drill and the skirt drill of the cutting and grinding device are contacted with a hard but brittle material such as glass plate etc., by rotating and advancing the device to cut and grind the material, and giving eccentric movement between said drills and the material to cut out a doughnut shaped substrate, after then, the doughnut shaped substrate and the device are relatively shifted so that the doughnut shaped substrate may be accommodated in the device, and further, the inner circumference and the outer peripheral edge of the doughnut shaped substrate are contacted with the annular cavities formed at upper parts of the core drill and the skirt drill respectively so that between the device and the doughnut shapes substrate an eccentric movement may be generated to cut and grind the inner circumferential part and the outer peripheral part of the substrate.

The core drill and the skirt drill of the cutting and grinding device are contacted with a hard but brittle material such as glass plate etc. to be worked, and cut and grind the material by rotating the device so that a doughnut shaped substrate can be cut out, and by keeping the condition, the doughnut shaped substrate and the device are relatively shifted so that the doughnut shaped substrate may be accommodated in the inside of the device to contact with the annular cavities respectively formed at the inner circumference of the core rod and the outer periphery of the skirt so that the inner circumferential part and the outer peripheral part can be clearly cut and ground. In addition, the work for cutting and grinding the doughnut shaped substrate can be carried out consistently at one side of the substrate (claim 1).

In the case of cutting out and grinding the doughnut shaped substrate, the eccentric movement is generated between the drills of the cutting and grinding device and the hard but brittle material by rotating and advancing the device, so that, without generating any breaking-off in the hard but brittle raw material, the doughnut shaped substrate can be cut out from one side of the material. After then, when both the circumferential and outer peripheral parts of the doughnut shaped substrate are ground, the inner circumferential part and the outer peripheral part of the doughnut shaped substrate come to be contacted respectively with the annular cavities formed on the upper part.

DESCRIPTION OF THE PREFERRED EMBODIMENTS

Hereinbelow, an embodiment of the present invention will be described in detail with reference to the accompanying drawings.

Figure 1:
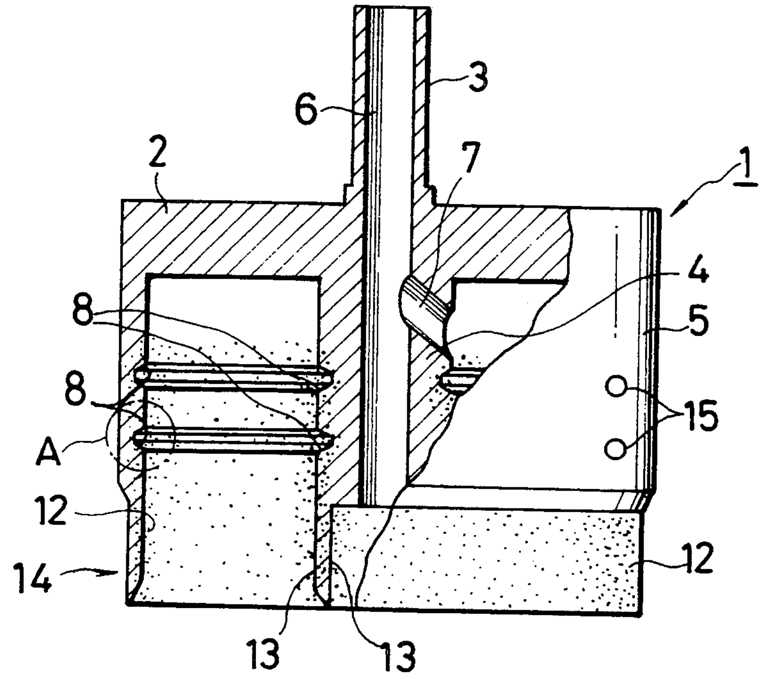
FIG. 1 is a sectional view of an embodiment of a device of the present invention.
Figure 2:
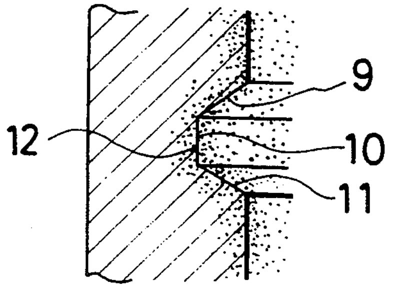
FIG. 2 is an enlarged sectional view of a part A shown in FIG. 1.

FIGS. 1 and 2 show a cutting and grinding machine (1) (hereinafter, refer to a device (1)) for cutting and grinding a plate of hard but brittle material such as glass plate etc. to make a doughnut shaped substrate. A shank (3) is projected upwardly from a top plate (2), and a tubular core rod (4) is extended downwardly in coaxially with the shank (3), and further a skirt (5) is droopingly formed from the circumferential part of the top plate (2) so that the core rod may be surrounded by it.

The device (1) is made of steel and an axial center penetrating hole (6) is bored from the upper central part of the shank (3) to the lower end of the core rod (4)), and on the way of the core rod (4) there is bored a branched path (7) which is opened between the skirt (5) and the core rod (4). Both at the outer periphery of the core rod (4) and the inner circumference of the skirt (5) there are formed a plurality of annular cavities (8). Each of the annular cavities has a section, as shown in detail in FIG. 2, of a trapezoidal shape, that is, it is has an upwardly inclined plane (9), a vertical plane (10) and a downwardly inclined plane (11).

At each of the annular cavities (8) there is provided a diamond whetstone part (12). It is very convenient for manufacturing the device to cover nearly the whole inner circumference of each of the annular cavities, the outer periphery of the core rod (4) and the inner circumference of the skirt (5) with the diamond whetstones (12). The diamond whetstone part (12) is manufactured as a metal-bonded whetstone or an electrodeposited whetstone. The metal-bonded whetstone has a longer durable life, but since it has a rather complicated shape, it requires higher technique and higher cost. On the other hand the electrodeposited whetstone is convenient for manufacturing whetstones of having predetermined shapes.

At the lower portion of the core rod (4) there is formed a tubular core drill (13) being coaxial with the core rod (4) and having nearly the same diameter as that of the core rod (4), and in both the inner circumference and the outer periphery of thereof the diamond whetstone part (8) is provided. Further, at the lower portion of the skirt (5) a skirt drill (14) being coaxial with the skirt (5) and having somewhat smaller diameter is formed and at the both inner and outer circumferences thereof the diamond whetstones (8) are provided.

The axial center penetrating hole (6) is an inlet for supplying cooling medium (liquid) for discharging dusts and small pieces generated by cutting and grinding and for removing heat generated by cutting and grinding operation. A plurality of water discharging outlets (15) are respectively bored at each of the inner circumferences of the skirt (5) to discharge the cooling medium efficiently.

Processes for manufacturing a doughnut shaped substrate by using the afore-described cutting and grinding device with reference to FIGS. 3 to 6 will be hereinafter described. Firstly, a glass plate (17) is suctionedly attached onto a suctioning table (18) by air suctioned by a suctioning hole (16), and by rotating the device (1) secured to a chuck (19) with high speed, it is lowered in the direction of the glass plate (17).

The core drill (13) and the skirt drill (13) of the cutting and grinding device (1) are contacted with the glass plate (17) and the device (1) is rotated and advanced to perform cutting and grinding operation. In order to give simultaneously an eccentric movement between the device (1) and the glass plate (17), an axis of the suctioning table (18) is shifted by a/2 from an axis (20) of the chuck (19) and by rotating the suctioning table around the rotating axis, that is, around the revolving axis (20) of the suctioning table (18) by keeping the shifted distance of a/2, i.e., with a radius of a/2. Where "a/2" is a distance between the axial center of the chuck (19) and the rotational center of the suctioning table.

Drilling speed, that is, the cutting and grinding speed of the device (1) is reduced in the vicinity of the last portion of the side from which the device is fallen down, that is, the portion to be penetratedly opened, when it completes the penetrating work. For example, in the case of penetrating a glass plate having thickness of 3.5 mm for 6 seconds, approximate $\frac{3}{4}$ of the thickness (2.625 mm) of the glass plate is bored for about 3 seconds, and the remained thickness of $\frac{1}{4}$ (0.875 mm) thereof is drilled to penetrate the plate by gradually reduced speed for 3 seconds.

As described the above, with multified effects caused by the relative eccentric movement between the device (1) and the glass plate (17) and the reduced drilling (cutting and grinding) speed in the vicinity of the opening of the glass plate (17) from which the device (1) is fallen down by its core drill (13) and skirt drill (14), drilling and grinding pressure applied to the neighbour of thinned opening part of the glass plate (17) is attenuated, which can result in conspicuous reduction of breaking-offs from positions at which drills contact with the glass plate and begin to drill to the opening portion from which the drills of the device fall down.

Figure 3:
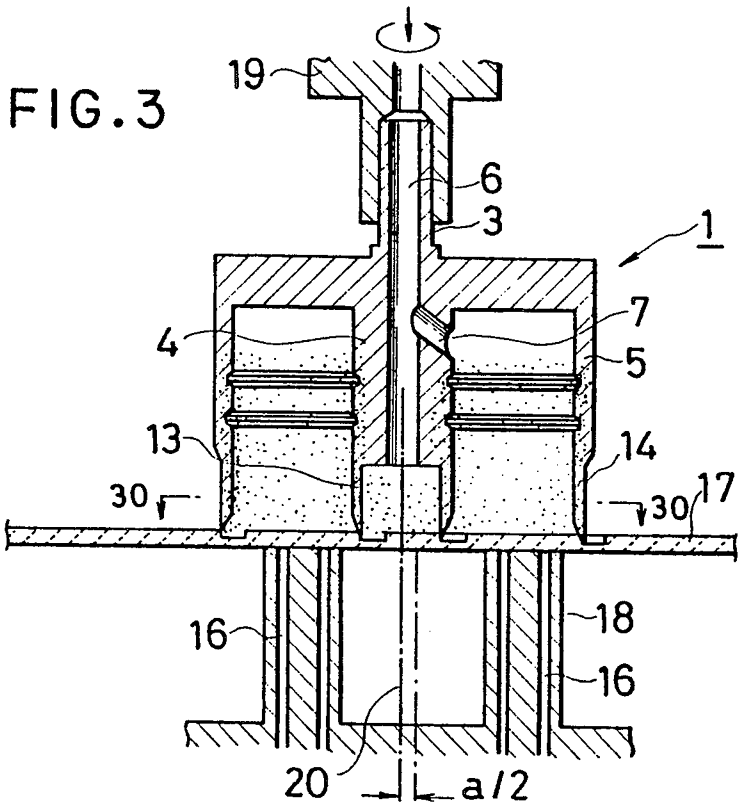
FIG. 3 is a sectional view of a process of manufacturing a doughnut shaped substrate by applying the device which is a sectional view showing a shifting process in which the substrate is being cut out.
Figure 4:
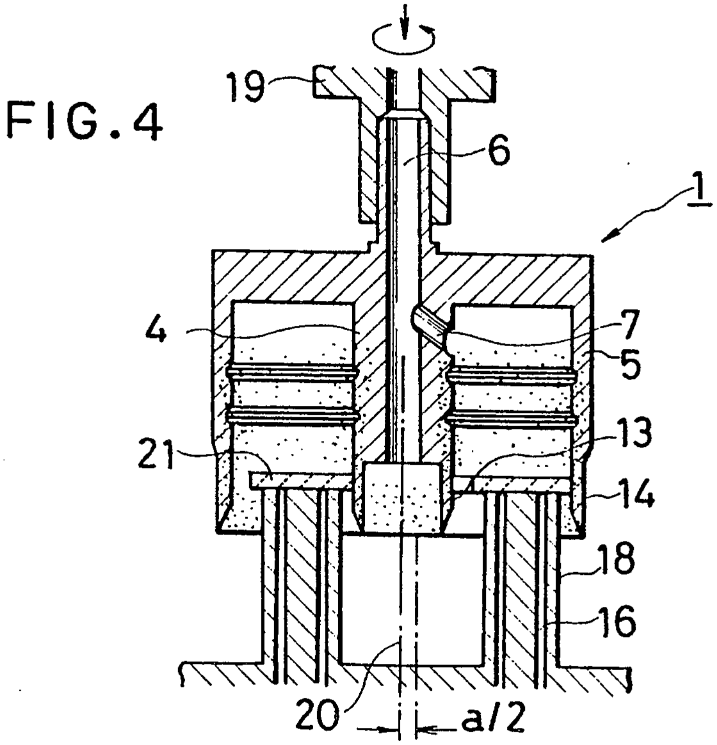
FIG. 4 is a sectional view of the process of manufacturing a doughnut shaped substrate by applying the device which is a sectional view showing the shifting process after the substrate being cut out.
Figure 5:
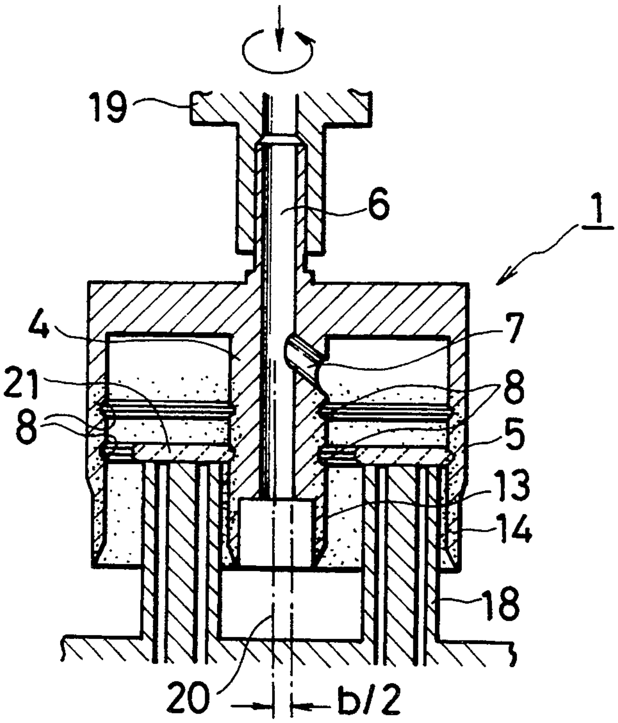
FIG. 5 is a sectional view of a cutting and grinding process in the doughnut shaped substrate manufacturing processes applying the device.
Figure 6:
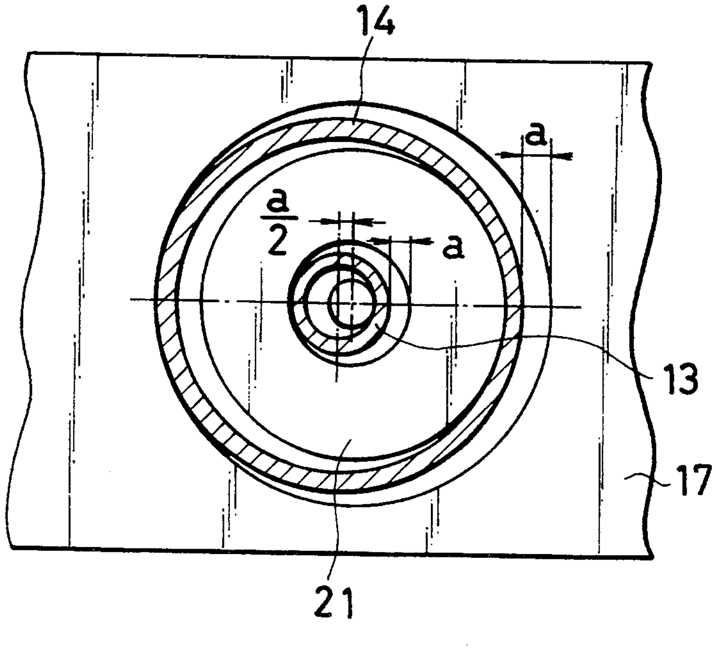
FIG. 6 is a sectional view cut along A—A line shown in FIG. 3.

A doughnut shaped substrate (21) cut and ground out by the process shown in FIG. 3 is accommodated in the device (1), when the device (1) goes down further. At this moving downward duration of device, the both inner circumference and the outer periphery of the substrate are cut and ground by the diamond whetstone parts (12) provided at both the inner and outer circumference of the core drill (13) and the skirt drill (14).

Each of the afore-described plurality of annular cavities (8) has respective different sections in the upwardly inclined plane and the downwardly inclined plane. Therefore, according to thickness of the doughnut shaped substrate (21), it is possible to select any of the annular cavities (8). The device (1) is further lowered so that the doughnut shaped substrate (21) may be positioned in one of the annular cavities which coincides with thickness of the substrate. When it is positioned, the lowering movement of the device (1) is stopped. Then, the suctioning table (18) is revolved around the rotational axis of the chuck (19), that is, the revolutional axis (20) of the suctioning table (20) with a radius of b/2 a little larger than the afore-described radius a/2 so that relative eccentric movement may be caused between the device (1) and the doughnut shaped substrate (21).

Figure 7:
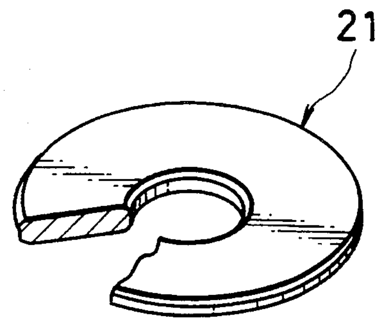
FIG. 7 is a perspective view of the doughnut shaped substrate after having been manufactured.

Because of the reason afore-described, with each of the annular cavities (8) formed respectively at the upper parts of both the core drill (13) and the skirt drill (14), the inner circumferential part and the outer peripheral part of the doughnut shaped substrate (21) are contacted, and by the eccentric movement given between the device (1) and the substrate (21), the cutting and grinding works of both the inner circumferential and the outer peripheral parts of the doughnut shaped substrate (21), that is, finishing and chamferring works of the doughnut shaped substrate are carried out. Thus, the doughnut shaped substrate (21) shown in FIG. 7 can be produced by a consecutive operation from one side of the substrate.

Other than the afore-mentioned, there are other embodiments and in one of them the suctioning table (18) is immovably secured, and the device (1) can be rotated and set to start the cutting and grinding operation by controlling the X Y Z axes of the device (1) and can be also revolved around the central axis of the glass plate (17) to be processed with a radius of a/2 or b/2 so that an eccentric movement can be generated between the device (1) and the glass plate (17). Further, it is also possible to achieve the manufacture a desired product by rotating the suctioning table (8), and simultaneously moving it reciprocally in the horizontal direction with a stroke of a or b to generate an eccentric movement therebetween.

The essence of the afore-described lies in achieving a relative eccentric movement between the device and the glass plate.

When the glass plate is cut out, water is supplied into the axial center penetrating hole (6), and the water is efficiently discharged through the contacting portions with the diamond whetstone parts and a gap "a" which is made between the drills and the glass plate to be worked by the relative eccentric movement between the drills of the device and the glass plate to be worked, so that high cooling efficiency can be expected, and further glass powders generated by cutting and grinding operation and powders of diamond whetstones fallen off can be also efficiently discharged to proceed the drilling operation and extend duration life of the drills.

In addition, when the doughnut shaped substrate (21) is cut and ground, water is efficiently discharged through the water discharging outlets (15) which are bored to the skirt (5). In the present embodiment the device (1) is made of steel, but, of course, it can be made by light weight material such as aluminium, plastic resin (for example, bakelite) etc. That is, any material can be selected.

According to the present invention, the following effects can be obtained. That is, as claimed in claim 1, with a consecutive operation from one side of the doughnut shaped substrate cutting out and grinding the circumferential parts of thereof can be carried out, so that at only one working place the work for cutting out the glass plate and working for grinding, finishing and chamfering the circumferential end surfaces of the substrate can be completed. Thus, waste of working space can be avoided. Further, after cutting out a doughnut shaped substrate from a glass plate, there needs no work to dispose the substrate onto the vacuum suctioning table on which the finishing and chamferring works are carried out, so that problems of the conventional art that arises out of misalignment in the axial center which results in inaccuracy of the doughnut shaped substrate can be easily solved.

In the invention claimed in claim 2 besides the effects described regarding claim 1, it is further advantages that water supplied to the axial center penetrating hole of the device is discharged through the gap formed between the inner and the outer circumferential parts of the drills and the substrate (hard but brittle material) by the relative eccentric movement between the drills and the substrate, so that higher cooling effect can be obtained and glass powders generated by cutting and grinding operation and fallen off diamond powders from the diamond whetstone part are also flown out. Therefore, high drilling speed of the device can be achieved and durable life of the drilling parts can be also extended.

What is claimed is:

1. A method for cutting and grinding a hard but brittle material to produce a doughnut shaped substrate having an inner circumference and an outer periphery, and comprising the steps of:

a. associating a core drill with a skirt drill of a cutting and grinding device in contact with said material, each said drill having at least one circumferential cavity provided with diamond whetstone parts;

b. cutting out and grinding a doughnut shaped substrate from said material by rotating and advancing said cutting and grinding device in contact with said material while providing eccentric motion between the drill of said device and said material;

c. moving said doughnut shaped substrate with respect to said device so that said substrate becomes at least partially contained within said device;

d. contacting the inner circumference and the outer periphery of said substrate with the circumferential cavities of said core and skirt drills, respectively, and providing an eccentric movement between said device and said substrate;

wherein the drilling speed of said drills is reduced after initially penetrating into said material, and said drilling speed of said drills is adjusted so that said drills are advanced to a position of about $\frac{3}{4}$ thickness of the whole thickness of the material in about one half of total drilling time, and thereafter the drilling speed of the drills is reduced so that the remaining thickness of $\frac{1}{4}$ of the whole thickness of the material is drilled out in the other half of the total drilling time.

2. A method according to claim 1, wherein said circumferential cavities have trapezoidal shapes.

3. A method according to claim 1, wherein said whetstone parts of said core drill are on an outside portion thereof.

4. A method according to claim 1, and further comprising the step of supplying a liquid to said material during cutting and grinding thereof for cooling said drills and for washing away particulate matter generated during said cutting and grinding.

5. A method according to claim 4, wherein said liquid is supplied to said material from a plurality of liquid discharging outlets in said skirt.

6. A method according to claim 1, wherein said core drill comprises two circumferential cavities.

7. A method according to claim 1, wherein said skirt drill comprises two circumferential cavities.

8. A method according to claim 1, wherein each said core rod and skirt comprise two circumferential cavities.

* * * * *